US005867882A

United States Patent [19]

[11] Patent Number: 5,867,882

Karlyn et al.

[45] Date of Patent: Feb. 9, 1999

[54] PROCESS FOR THE PREPARATION OF SILK-SCREENS FOR USE IN PRINTING HALF TONES

[75] Inventors: William M. Karlyn, Lynnfield; David A. Scher, Groveland; Robert E. Wesinger, Wilmington; Michael E. Bissel, Beverly, all of Mass.

[73] Assignee: Autoroll Machine Company, LLC, Middleton, Mass.

[21] Appl. No.: 623,947

[22] Filed: Mar. 29, 1996

Related U.S. Application Data

[62] Division of Ser. No. 419,038, Apr. 10, 1995, Pat. No. 5,562,030.

[51] Int. Cl.[6] .............................. B23P 11/02; B41C 1/14; D06C 3/08

[52] U.S. Cl. ........................... 29/448; 29/458; 101/128.4; 38/102.91

[58] Field of Search ............................. 101/128.4, 127.1, 101/128, 128.1; 38/102.91, 102.1, 102.2; 112/103, 119; 160/374.1, 378; 140/108, 109; 29/448, 458

[56] References Cited

U.S. PATENT DOCUMENTS

| | | | |
|---|---|---|---|
| 4,291,116 | 9/1981 | Tibbetts . | |
| 4,337,134 | 6/1982 | Norman . | |
| 4,368,587 | 1/1983 | Childs . | |
| 5,220,867 | 6/1993 | Carpenter | 101/128.4 |
| 5,327,828 | 7/1994 | Barocas et al. | 101/128.4 |
| 5,353,701 | 10/1994 | Casagrande | 101/128.4 |
| 5,355,791 | 10/1994 | Benedetto et al. | 101/128.4 |
| 5,396,721 | 3/1995 | Levine et al. | 38/102.91 |
| 5,580,698 | 12/1996 | Andersen | 101/128.4 |
| 5,581,918 | 12/1996 | Schilling et al. | 38/102.91 |

*Primary Examiner*—S. Thomas Hughes
*Assistant Examiner*—Tisa Stewart
*Attorney, Agent, or Firm*—Herbert L. Gatewood

[57] ABSTRACT

An apparatus and process for the manufacture of silk-screens is provided for use in the printing of halftones, e.g. in a four color printing process. The angle at which the mesh of a silk-screen should be relative to the screen frame to eliminate or at least minimize or localize moire' is predetermined for each of the color film separations. This angle is then carried to stretching apparatus for the woven fabric from which the silk-screens are to be made. The stretching appararatus has a table that is provided with a plurality of rotatable members. A screen frame is placed on each of the rotatable members and the rotable member is rotated to the angle determined by the pre-registration apparatus. The fabric is stretched to the desired tension and the screen frames having been provided at the desired angles are adhered to the stretched fabric, resulting in the mesh in each silk-screen being at the correct angle with respect to the screen frame.

15 Claims, 7 Drawing Sheets

THE MESH/DOT RELATIONSHIP
AND MOIRE

| HALFTONE LINE COUNT | MESH COUNT 305 | 355 | 380 | 420 | 465 |
|---|---|---|---|---|---|
| 85 | ⓧ | ⓧ | ● | ● | ● |
| 100 | X | ⓧ | ⓧ | ⓧ | ● |
| 120 | X | ⓧ | ⓧ | ● | ● |
| 133 | X | X | X | ⓧ | ● |
| 150 | X | X | X | X | X |
| 175 | X | X | X | X | X |

ⓧ POSSIBILITY OF MOIRE, USUALLY LOCALIZED

● LITTLE POSSIBILITY OF MOIRE

X PROBABLE MOIRE INTERFERENCE

Fig. 7
(Prior Art)

PROCESS FOR THE PREPARATION OF SILK-SCREENS FOR USE IN PRINTING HALF TONES

This application is a division of application Ser. No. 08/419,038 filed Apr. 10, 1995, now U.S. Pat. No. 5,562,030.

BACKGROUND OF THE INVENTION (1). Field of the Invention

This invention relates, in general, to silk-screen printing. More particularly, the invention relates to the silk-screens used in a multicolor half tone silk-screen printing process, such as the four-color silk-screen printing of the surface of a compact disc, and to the method for manufacture of those screens.

(2). Description of the Prior Art

Silk-screen printing, in general, involves the use of a screen, i.e., a woven mesh fabric, stretched over a frame and the design or text to be printed is provided on the screen in outline form, in the nature of a stencil. The design to be printed is provided in the silk-screen, in general, by coating the screen with a photosensitive emulsion, exposing the emulsion to obtain the desired image and then washing the unexposed areas to leave the screen with the image to be printed. The design or text is reproduced on a desired object, e.g., the surface of a compact disc, by having a squeegee force color, i.e., ink, through the mesh of the exposed areas of the screen. Thus, the image or text printed comprises a plurality of closely spaced dots of color.

Half-tone printing, contrary to full color printing, involves a shading or gradation of color. In such printing, the gradation of the tone of color is obtained by a system of closely spaced dots arranged in parallel lines. For example, in the four color printing of the surface of a compact disc, this involves the separate printing of a line of dots of cyan, black, magenta, and yellow of full color, in turn. The dots of different color being printed need be provided in proper linear registration in respect to one another to provide the desired color tone. Thus, a line of full color yellow dots may be printed on the surface of a compact disk followed by the printing of a line of dots of magenta. These lines of dots of different color must be printed at predetermined angles, i.e., the angles of color separation, and in proper registration with one another to provide the desired gradation of color and to prevent moire'. The lines of dots of color are provided at predetermined angles so that the lines do not cross one another. The angles of color separation depend to some extent upon the particular printing process involved, i.e., offset, silk-screen, etc. It is important that the three darkest colors involved, i.e., magenta, black, and cyan be at angles 30° apart from one another, i.e., 15°, 45°, and 75°, respectively. The yellow color separation should desirably be at either 0° or 90°. An almost endless number of color tints can be obtained by combining the four basic colors. Nevertheless, as is known by those skilled in the art of silk-screen printing, these angles follow the so-called "North American" offset standard and differ somewhat from the "European" offset standard. These angles, at which lines of dots of color should be printed in halftone printing do not necessarily, however, provide the ideal solution for silk-screen printing. Many such printers have developed color separation angles with their color separators that will work with the mesh counts usually used in silk-screen printing processes.

Registration of the lines of printed dots to one another to provide a suitable halftone presents no particular problem in printing processes other than in silk-screen printing. For example, in an offset printing process, registration can be relatively easily accomplished. Nevertheless, in the case of silk-screen printing, the proper registration of the lines of dots of color being printed is of particular concern. Otherwise, a unique problem called "moire" occurs. Moire' can result for several reasons. One reason is that the lines of dots of ink being pushed through the mesh of the silk-screen are not uniformly spaced apart from one another. Some lines of dots are at the desired spacing, and others are not. Other lines of dots of color may be spaced closer or further apart than is the desired spacing. The nonuniform line spacing is, of course, due either to the nonuniform spacing of the warp and weft threads forming the woven screen or the fact that the mesh or openings in the screen being used are not properly aligned in a straight line. These problems are the result of the lack of uniform stretching of the woven fabric from which the screen is made. Where this occurs, the warp threads may be at a different degree of tension than the weft threads and some movement of next adjacent threads away or toward one another may occur in the screen during use.

Another reason for moire', and perhaps the major reason, is the fact that the line of dots of one or more of the color separations may not be provided at the desired angle relative to the mesh in the screen. Thus, for example, in the first color being printed, if the angle of the dots being printed is only slightly different from the angle of color separation, moire' will occur even though the other colors being printed corresponds to that of the color separations. Or, on the other hand, the first color printed may be at the correct angle, and one or more of the subsequent colors printed be at an improper angle.

Moire' manifests itself in a series of visual bands which present an unsuitable shimmering pattern or wave-like appearance in the gradation of color on the object being printed. Moire' is a particular problem in the four-color printing of objects, e.g., the surface of a compact disc. In this case, the color separation for each of the halftone screens must be at the proper angle, to avoid the moire' effect.

Heretofore, the manner of eliminating, or at least reducing, moire' in silk-screen printing has been most difficult. Changing the angle or size of the screen, i.e., the mesh count of the woven fabric used in the manufacture of the screen, usually solves the problem. Nevertheless, the manufacture of a silk-screen for halftone printing is a somewhat costly and labor intensive operation. Where moire' occurs, the making of a new set of screens with different color separation angles or a different mesh woven fabric, or both, merely compounds this expense to a printer.

The manufacture of a silk-screen for use in the printing of halftones involves a number of individual steps. The first step is to make color separations of the halftone image involved. This is done at a predetermined line count, preferably at a line count of 120 lines of dots of color per inch, as such gives some latitude in the choice of a woven fabric for use in making a silk-screen. The color separations may be made by either the printer or the screen manufacturer, generally by the printer. Where the color separations are made by the printer, the silk-screen manufacturer nevertheless confirms the halftone line count for each of the color separations, using a halftone calculator according to conventional techniques. In four color printing, this involves four different color separations; hence, the screen manufacturer need make four confirmations.

In general, the confirmation of line count involves the placement of each color separation or film positive, in turn, on a light table having a single point incandescent light, e.g., a 60 watt bulb, and taping the color separation in place, emulsion side up. This is accomplished after the crop marks provided on the film positive, at 3, 6, 9 and 12 o'clock are lined up, in usual manner, with those provided on the light table. The Calculator is then rotated on top of each of the color separations. The largest moire' effect visually observed indicates the line (or dot) count. This process is repeated for each of the colors involved.

Next, using a conventional Star Guide Orientator, the halftone angle for the lines of dots of color for each color separation is determined. This is done, in general, by rotating the Star Guide on top of the film positive until the moire' effect is again obvious. This indicates the angle of separation for that particular color. The same light source is used for the angle determination, as for the line count. In general, the preferred angles for color separation are cyan (75°), black (45°), magenta (15°), and yellow (90° or 0°), these being the North American offset standards earlier disclosed.

Next, one determines the proper thread count for the halftone silk-screen printing to be done, i.e., the woven fabric to be used in the manufacture of the silk-screen whereby moire' will be eliminated, or at least reduced. This is done by reference to a conventional chart, disclosed more fully hereinafter, showing the relationship between halftone line count and the thread count of a woven fabric and moire'. In general, the higher the thread count, the least likely that moire' will result, even over a relatively large range of halftone line count. For example, at a thread count of 465 threads/inch, there is little possibility that moire' will result even at a halftone line count varying from 85 lines/inch to 133 lines/inch. A line count of 120 lines/inch is preferred, however, as the chart shows there to be little likelihood of moire' occurring at a mesh count of either 420 or 465 threads/inch. Thus, based upon the line count determined for the color separations and thread count relationship, one chooses that woven fabric having a thread count for manufacture of silk-screens least likely to result in moire'.

The next step is to determine the angle of mesh for each of the color separations at which moire' can be least detected by visual observation. This is done, in general, by laying a 90° screen of the right mesh size over the taped positive on the light table. The screen is then rotated by hand until moire' can no longer be detected, or at least until moire' is localized and minimized. The rotation of the screen for moire' to be no longer detected may need be in either a clockwise or counterclockwise direction. A conventional protractor is then used to measure the angle that a moire' free screen varies from the starting position, and in which direction. This procedure is followed for each of the colors involved.

The mesh angle is sometimes confirmed by rotating the film positive rather than the screen, the film positive being located at the angle earlier determined. The 90° screen is then set square over the positive. If moire' hasn't changed then this is the angle at which the woven fabric mesh is located relative to the screen frame in the fabric to be stretched to manufacture the silk-screens.

A suitable size woven fabric, square cut, and of the thread count previously determined, is then located in usual manner in stretching apparatus and stretched. This is accomplished by grabbing each of the opposed edges of the fabric with an elongated stretching bar. The warp threads terminating in for example, opposed end edges are stretched in opposite directions, and the weft or fill threads terminating in opposed side edges are stretched in opposite directions. The screen fabric should be stretched to a tension of at least about 16–20 newtons, an even higher tension being more desirable. The higher the tension, the less off contact is needed between the silk-screen and object being printed, e.g., a compact disc, to be printed. The higher the tension in a screen, the more it springs back after ink is pushed through the screen mesh, which helps to prevent distortion in the final printed image. Importantly, however, all the screens to be used in, e.g. the four color printing process, must be at a consistent tension.

The highest tension to which a woven fabric should be stretched is, of course, set by the fabric manufacturer. As is usual, a woven fabric following stretching, relaxes to a certain extent. This is, of course, taken into consideration when considering the tension to which a fabric should be stretched, the tension at any one time being determined in usual manner by conventional tension gauges. Certain mesh fabrics relax more than others. Nevertheless, after a period of use, the average relaxation period can be determined. A woven fabric in many cases is stretched to a 20% higher tension than necessary for the finished screen. Once the woven fabric is stretched to the extent desired, the silk-screen frames corresponding in number to the desired color separations are placed in contact with the bottom surface of the stretched fabric and the woven fabric stretched over the frames. Adhesive commonly used for this purpose is then applied to the top surface of the woven fabric, seeping downwardly through the mesh in the fabric to the frame. Prior to application of the adhesive, however, each frame is oriented on the stretched fabric at the desired angle, i.e., the angle at which it was previously determined, as above disclosed, that moire' could no longer be detected. This is accomplished, in general, by means of a conventional protractor placed along an edge of the frame. The stretched fabric is thus adhered to the silk-screen frame. This process is repeated for each of the colors involved in the color separation.

The screens are then each provided with the halftone image to be printed by that screen. This is done, in general, by first applying a photosensitive emulsion to the screen. A film positive e.g. of the color separation of cyan, is then placed against the emulsion and the emulsion is exposed by light. The unexposed areas of the emulsion are then washed out in conventional manner. This procedure is repeated for each of the color separations. The screens are then ready to be used in a silk-screen printing operation.

The determination of the angles for the mesh of the woven fabric relative to the screen frame to be used in the manufacture of a set of silk-screens for halftone printing, as earlier described, and rotating of the chosen woven fabric or film positives until it appears to the human eye that moire' is eliminated, or at least more localized, is largely a hit and miss procedure. The same is true with respect to the rotation of a screen frame to be adhered to the stretched woven fabric. As will be appreciated, these procedures depend to a large extent upon the eyes of the person aligning the film positives or woven fabric relative to one another, and the accuracy of the placement of the protractor. The carry over of that angle to the placement and orientation of screen frames on the stretched fabric using a protractor further compounds the problem.

Thus, it is highly desirable that an improved method for the providing of a set of silk-screens for use in the multicolor silk-screen printing of halftones, whereby moire' can be eliminated, or at least localized and minimized, be provided. It is also desired to provide apparatus for accomplishing the manufacture of silk screens that eliminates much of the guess work now involved in screen manufacture for printing halftones.

SUMMARY OF THE INVENTION

The present invention has as a primary object the providing of a set of silk-screens for use in the multicolor silk-screen printing of halftones on a surface not attendant with the problems and disadvantages in the manufacture of such screens heretofore.

Another object of the invention is to provide improved means for the stretching of a woven mesh fabric for use in the manufacture of a set of silk-screens to be used in the silk-screen printing of halftones.

Another object of the invention is to provide stretching apparatus for the stretching of woven fabric for the manufacture of silk-screens to be used in halftone printing whereby a consistent tension is provided in all the screens.

A further object of the invention is to provide apparatus to be used in the manufacture of silk-screens whereby such results in an improved method for the manufacture of silk-screens to be used in halftone printing.

A further object of the invention is to provide improved means for the orienting of a silk-screen frame relative to the mesh in a stretched woven fabric to be used in the manufacture of silk-screens for use in the printing of halftones on a surface.

A still further object of the invention is to provide improved means for determining the angle relative to the mesh in a woven fabric in a screen frame whereby moire' is eliminated or at least minimized and localized.

A still further object of the invention is to provide improved means for placement of a silk-screen frame at the best angle with a stretched fabric in the manufacture of silk-screens to be used in halftone printing whereby moire' will be eliminated, or at least minimized and localized.

An even further object of the invention is to provide improved means whereby the angle at which a silk-screen frame should be placed relative to the mesh in a stretched woven fabric in the manufacture of silk-screens for halftone printing is predetermined off-line from the stretching operation.

A still further object of the invention is to provide an improved method for the manufacture of silk-screens to be used in halftone printing whereby moire' is minimized.

Quite advantageously, the angles of meshes in a woven fabric and the orientation of the screen frame relative to those angles for the silk-screen printing of halftones can be accomplished by the method and apparatus of the invention with greater ease and accuracy.

BRIEF DESCRIPTION OF THE DRAWING

For a better understanding of the present invention and its preferred embodiments, reference should be made to the following detailed description which is to be read in conjunction with the accompanying drawings, in which:

FIG. 7 is a conventional chart used in the silk-screen printing field, prior to the invention disclosed herein, showing the relationship of halftone line count relative to the mesh (line) count in a woven fabric and the incidence of moire'.

DETAILED DESCRIPTION OF THE INVENTION AND THE PREFERRED EMBODIMENTS THEREOF

While the present invention will be described hereinafter with particular reference to the accompanying drawings, it is to be understood at the outset that it is contemplated that the present invention may be varied in specific detail from that illustrated and described herein while still achieving the desirable characteristics and features of the present invention. Accordingly, the description which follows is intended to be understood as a broad enabling disclosure directed to persons skilled in the applicable arts and is not to be understood as being restrictive.

Figure 1:
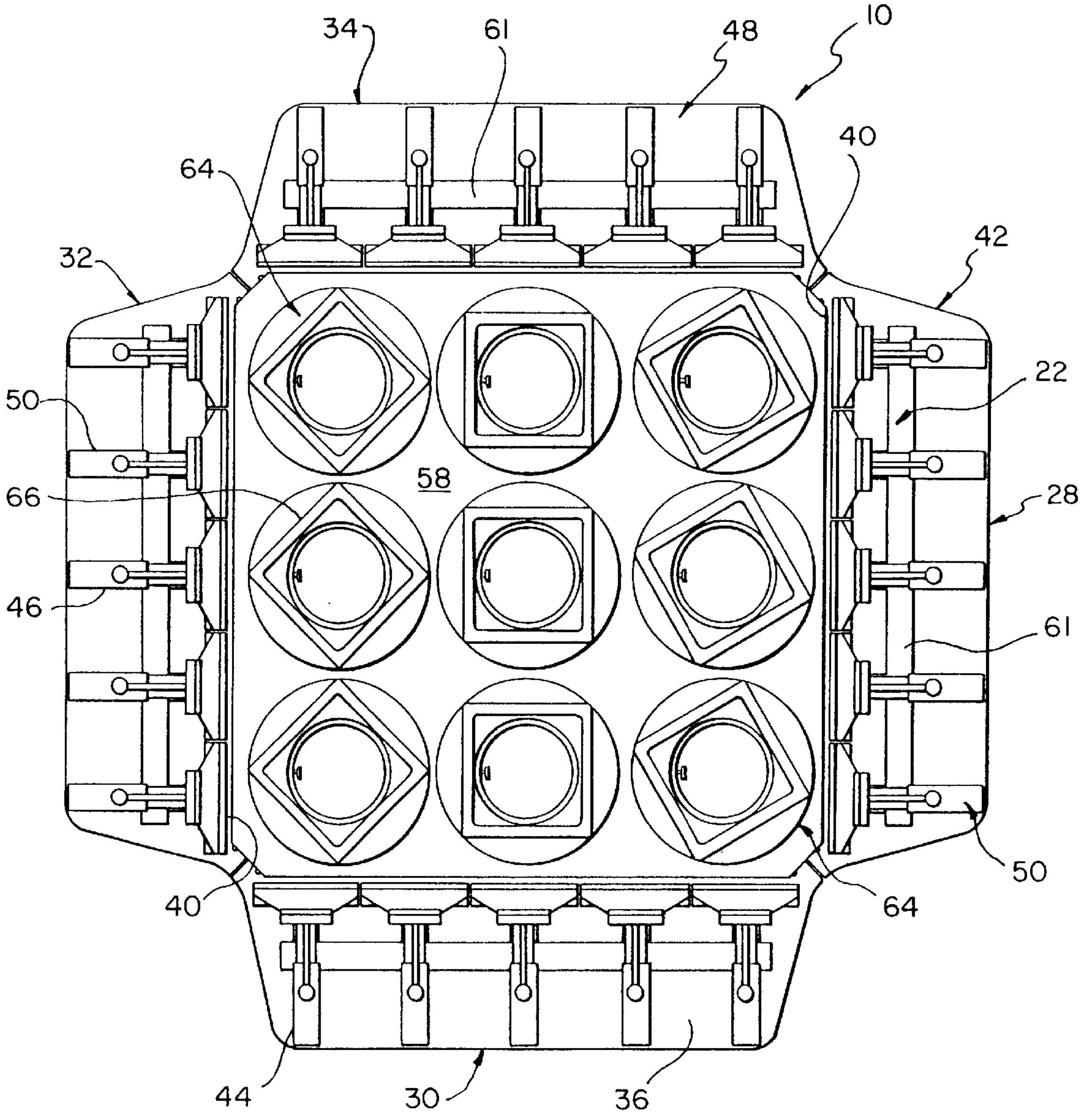
FIG. 1 is a top planar view of improved fabric stretching apparatus according to the invention for use in the manufacture of silk-screens to be used in the silk-screen printing of halftones.
Figure 2:
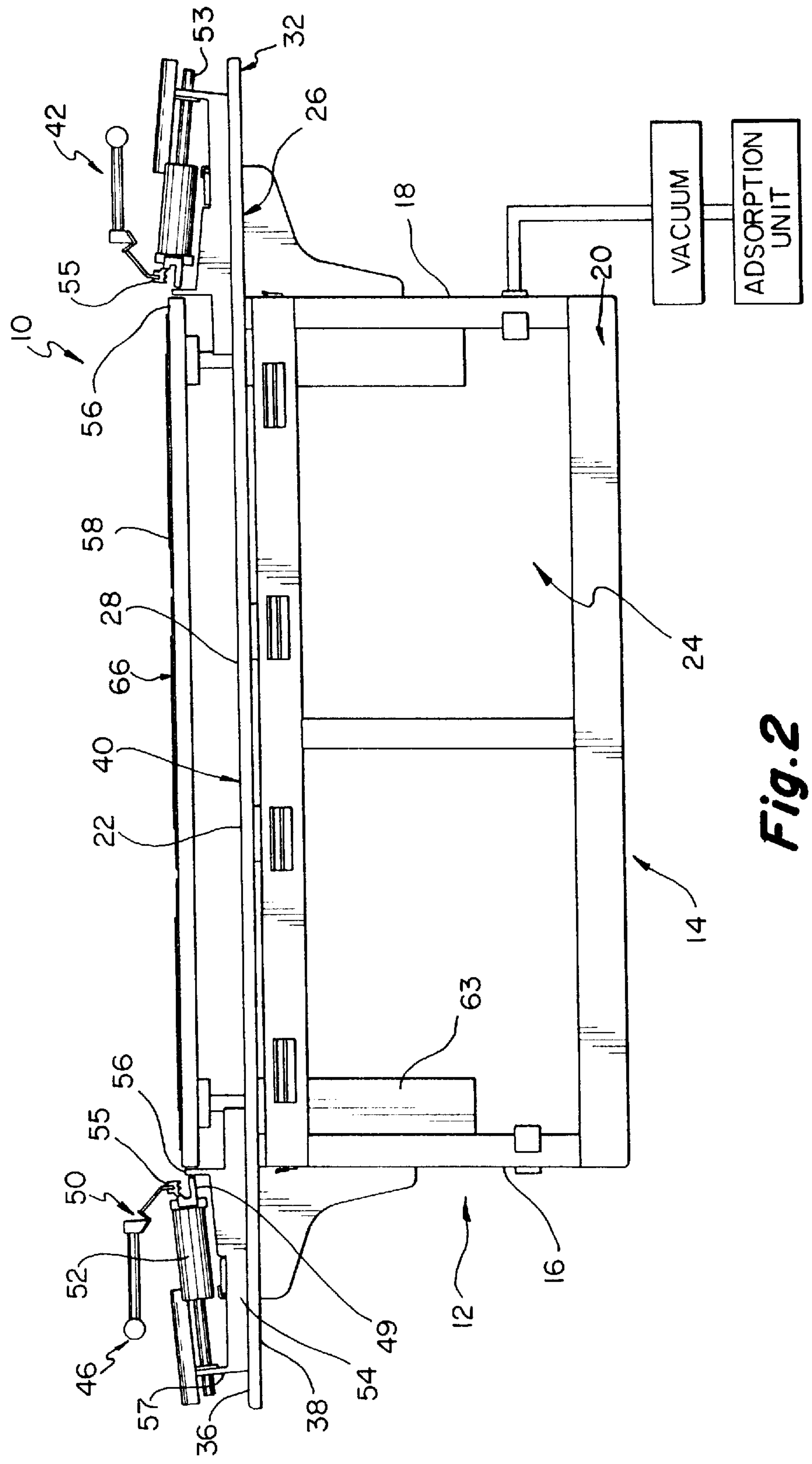
FIG. 2 is a side elevation showing a stretched fabric and the location of the table on which the screen frames are provided in proper orientation prior to being adhesively secured to the stretched fabric.
Figure 3:
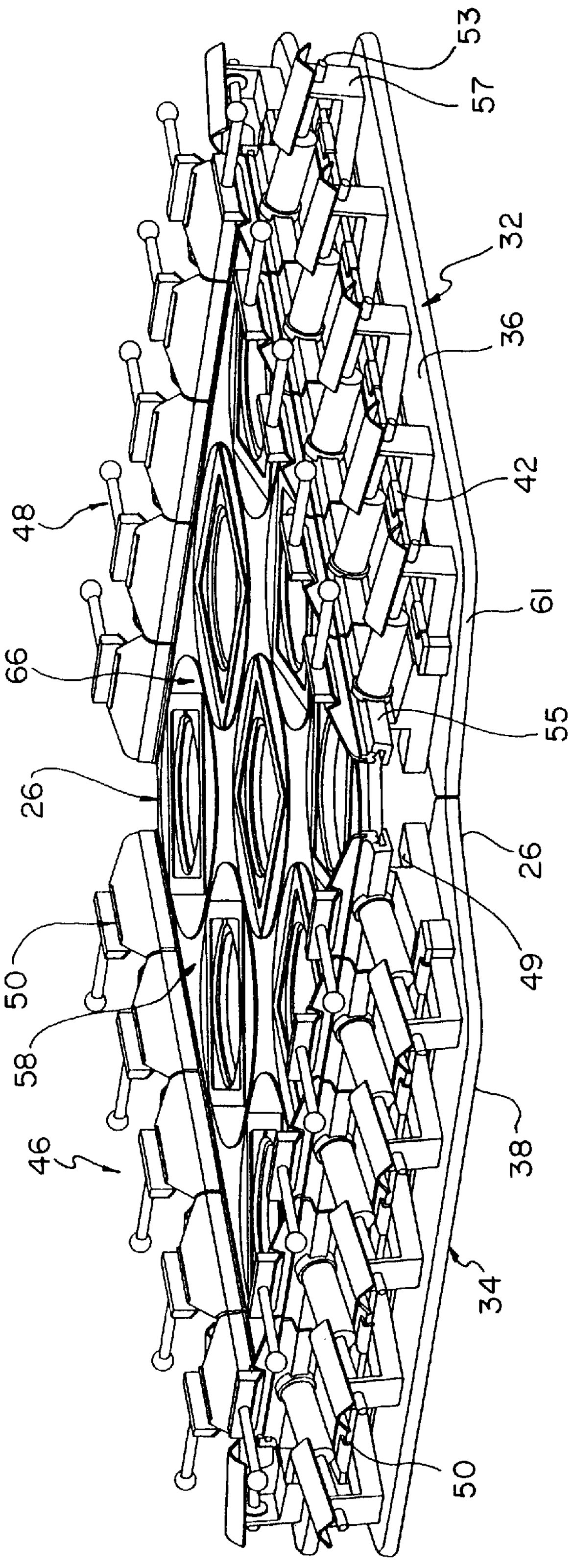
FIG. 3 is a perspective view of the stretching apparatus shown in FIGS. 1 and 2 but with the fabric removed and not showing the base member of the stretching apparatus.

Turning now to FIG. 1 of the drawing there is shown therein stretching apparatus to be used in the manufacture of silk-screens for use in the silk-screen printing of halftones according to the invention. The stretching apparatus, as shown in FIG. 2, comprises a bottom or base member 12 of a box-like configuration defined by a horizontally disposed closed bottom end 14 and spaced-apart, vertically upright, parallel side walls 16, 18 and end walls, only one of which, end wall 20, is shown in the drawing. The end wall 20 is provided with bracket members denoted generally by reference numeral 22 whereby doors can be provided on the base member end wall, as commonly done. These side and end walls intersect at 90° angles, respectively, to one another. Thus, there is provided an internal cavity 24, the purpose for which will be later made clear.

At the top end of the bottom member 12 there is provided a horizontally disposed support member 26 which lies in a plane parallel to that of the bottom end 14. As best seen in FIG. 1 of the drawing, the support member 26 is defined by extensions 28, 30, 32, and 34, these being in the same horizontal plane. Each of the extensions is defined by planar top and bottom surfaces 36, 38. The extensions 28, 30, 32, and 34 are each defined by an inner linear edge denoted generally by reference numeral 40. Thus, the base member 12 is provided with an open top, the purpose for which will be later disclosed.

The extensions 28, 30, 32, and 34 each support clamping means designated generally by reference numerals 42, 44, 46, and 48, respectively. The clamping means each comprises a plurality of conventional Tetko pneumatic clamps or clamping members, identified in general by reference numeral 50. These clamping members are available commercially from TETKO INC. of Briarcliff Manor, N.Y. under the trade designation model #SST clamp.

Figure 5:
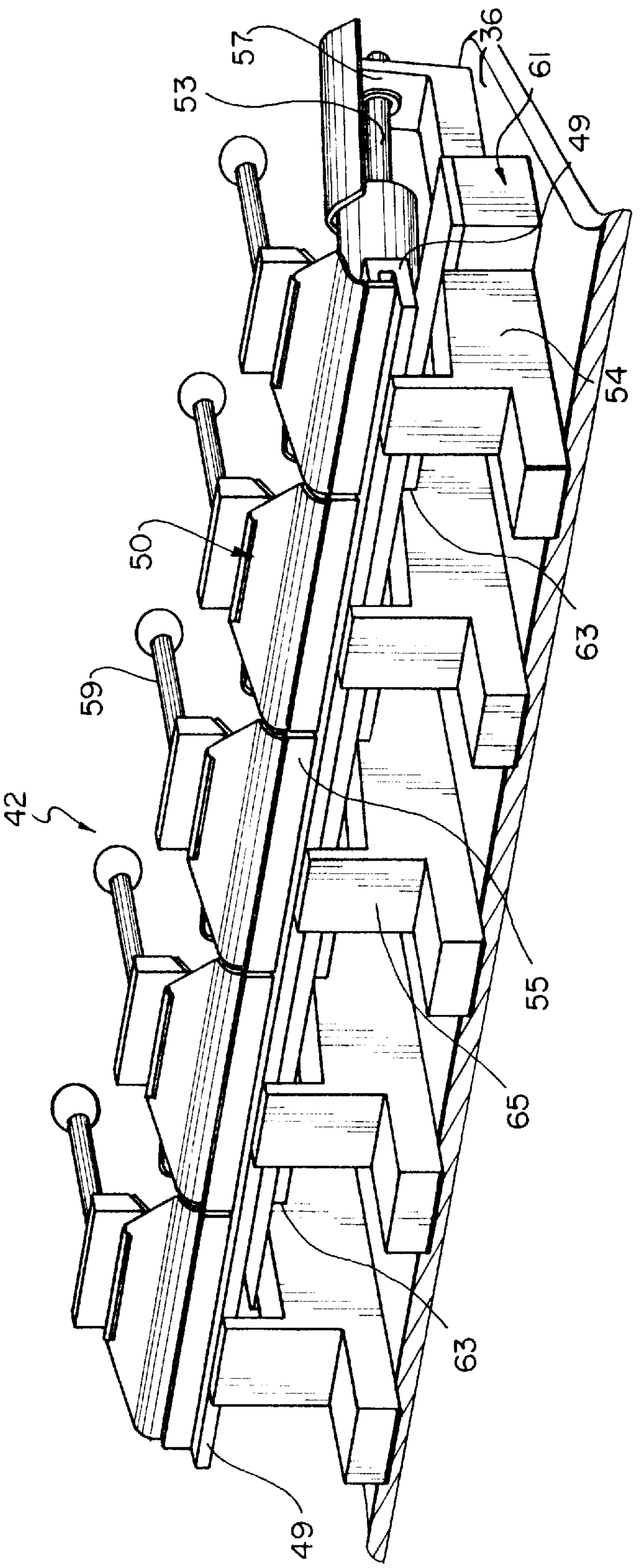
FIG. 5 is an enlarged view in perspective showing the means for clamping the ends of the warp and weft threads of the woven fabric for stretching the warp and weft threads of the fabric to the desired tension.

As the clamping members 50 are of identical construction, only one will be further described herein. The clamping members, as best seen in FIGS. 2 and 5, each comprise a head 52 and a clamp base 54, the clamp base 54 being defined by a horizontally disposed flat surface which is supported on the top surface 36 of an extension of support member 26. The head 52 of a clamping member is provided, at its front end, with a locking clamp 55 whereby the edges of the fabric 56 (FIG. 2) to be stretched can be securely gripped. The locking clamps 55 are each moveable toward and away from engagement with the fabric holding member 49 whereby the edges of the fabric can be gripped securely for stretching and then released when desired.

Each clamping member head 52 comprises a piston (not shown) provided with a connecting piston rod 53 the free end of which extends through an opening in a piston rod support member 57 which extends upwardly from the clamp base 54. The piston rods in each of the clamping members 50 are fixedly secured in the respective piston rod support members 57 thereby allowing the head 52 of a clamping member to move in a back and forth direction. Thus, the clamping members in opposition to one another can be caused to move toward and away from one another, as desired.

Although not shown in the drawings, those clamping members in opposition to one another, e.g., the clamping members 50 provided in the clamping means 42 and those in clamping means 46, are connected to conventional pressure means whereby an equal amount of pressure can be supplied to each of the clamping members.

To prepare a fabric for stretching, in general, the warp and weft edges of a fabric 56 (FIG. 2) are located on the holding members 57 of the respective clamping members 50. Then, an operator engages clamp handle 59 and, by hand, raises it upwardly and pushes it forward whereby to clamp securely, onto the respective fabric edge. Next, pressure is applied to the clamping member pistons whereby to cause the head 52 of opposed clamping members 50 to move away from one another thereby providing the desired amount of tension on the fabric. The clamping base 54 of each of the clamping members 50 in a clamping means, e.g., those clamping members 50 in clamping means 42 (FIG. 5), are held to the top surface 36 of an extension by an elongated bridging member or slat 61. As will be readily appreciated from FIGS. 1, 5, a slat 61 is mounted to a support member extension whereby to be in perpendicular disposition to the lengthwise direction of a clamp base 54. The front edge of a slat 61 is located against a shoulder or stop member 63 provided on the top surface of a clamp base 54. Although not shown in the drawings for sake of clarity, and because the clamping members are commercially available and are not a part of the invention in and of themselves, a clamp head 52 rides in a track which causes a clamp head to maintain a linear back and forth movement. The backward movement of a clamp head, as will be appreciated by reference to FIG. 1 of the drawing is such that it is limited to the back edge of a slat 61. As will be seen by reference to FIG. 5, each clamp base 54 is provided at its front end with a vertically disposed stop member 65, the purpose for which is primarily for safety reasons. Thus, in the event there should be a failure in pressure, the clamp members will be prevented from going forward beyond this point.

Although, it is common practice that the same pressure be applied to all the clamping member pistons that need not necessarily be the case. The pressure supplied to the stretching apparatus 10 can be different for opposing stretching means. For example, a predetermined pressure can be supplied to those opposed clamping members in clamping means 28, 32 and a lesser or greater predetermined pressure applied to those opposed clamping members in clamping means 30, 34. Accordingly, it is most preferred that pressure be applied independently to the opposed clamping means. The means for doing such can be readily accomplished by those skilled in the art. Thus, in the event that such is desired, different tensions can be applied to the warp and weft threads.

It makes no difference, however, in setting up the stretching apparatus 10 for stretching of the fabric 56 which of the clamping means clamps which edges, i.e., the ends of the warp threads or the ends of the weft threads. The important consideration is that the fabric be square to the square shape defined by the clamping means.

Although, as shown in FIG. 1, the clamping means each comprises five (5) clamping members, this is not necessarily critical in the practice of the invention. The clamping means may each include a greater or lesser number of clamping members. This will depend somewhat upon the size fabric involved. In the practice of the invention, with a plain weave fabric size of 61"×61", 5 clamps (10" wide clamps) were found to give quite satisfactory results in the stretching of the woven fabric. As will readily be appreciated by those skilled in the art, other clamping means and members may also be used in the practice of the invention, provided they accomplish the function intended herein.

Figure 4:
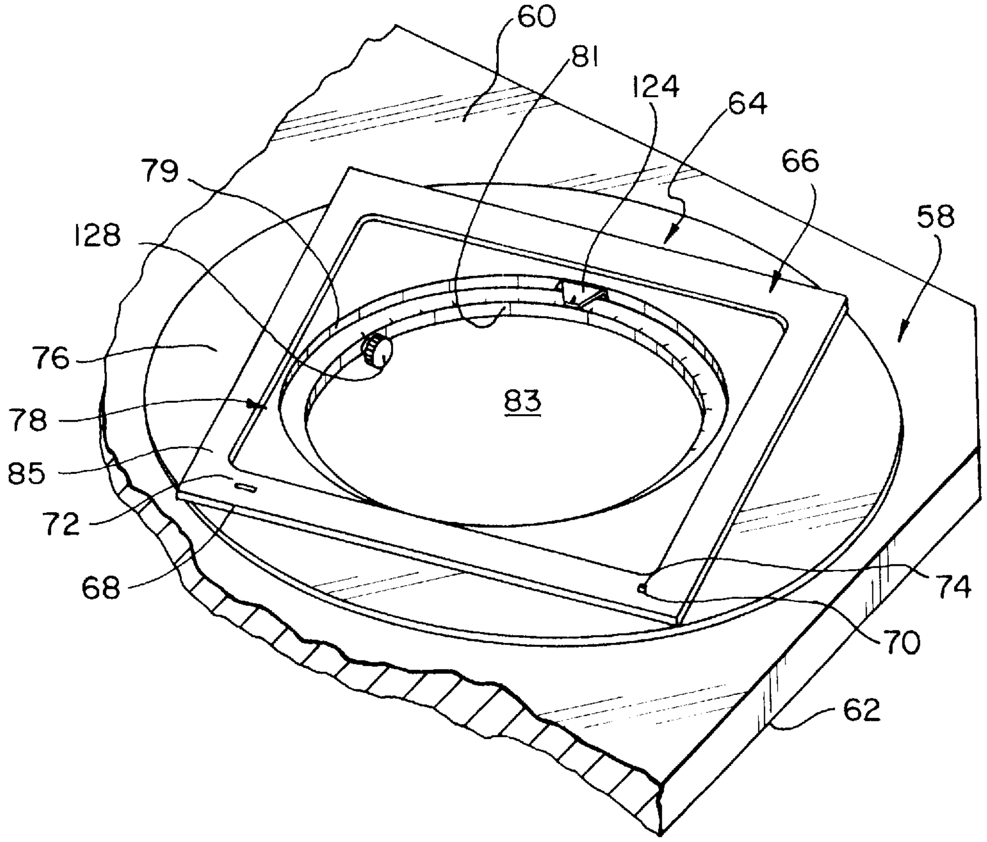
FIG. 4 is an enlarged partial perspective view better showing a registration head provided in the table located below the stretched fabric of the stretching apparatus of FIGS. 1 and 2 for orienting the screen frame at the proper angle relative to the mesh in the stretched fabric for the particular color separation involved.

Located below the stretched fabric 56 and between the fabric and the top surface 27 of the support member 26 (FIG. 2), and this is a critical feature of the invention, there is provided a table or platform 58 defined by top and bottom surfaces 60, 62 (FIG. 4). The table 58 is disposed horizontally so that the top planar surface 60 of the table is parallel to the plane defined by the stretched fabric 56. Table 58 is mounted according to conventional techniques so as to be movable vertically upwardly and downwardly, the reason for which will later be disclosed. This can be accomplished by crank operated hydraulic lifts such as denoted by reference numeral 67, as was done in the practice of the invention, or by pneumatic means, as desired. In general, four such lifts will be provided and in such locations as to better ensure that table 58 is provided in a horizontal plane and parallel to that plane defined by the stretched fabric 56.

There is provided in table 58, as best seen in FIGS. 1, 4 of the drawing, a plurality of annular-shape rotatable heads referred to generally by reference numeral 64. The table 58 shown in FIG. 1 is provided with nine rotatable heads; however, this is of no particular significance to the practice of the invention. The number of rotatable heads will, of course, be determined by the dimensions of table 58. Where the table is 54" square, nine rotating heads can be, most advantageously, provided in the table. This size table surface was determined to best utilize silk-screen production time and woven fabric mesh. Using a standard 61" bolt of woven fabric, there is a minimum of waste. Moreover, all mesh are readily available in, e.g., a 61" plain weave, woven fabric. Although a plain weave fabric has been used in the practice of the invention, fabric of other weaves can be used when desired, as is conventionally done in the manufacture of silk-screens.

These annular-shaped rotatable heads are, and this is a critical feature of the invention, individually rotatable, the reason for which will soon be made clear. The annular-shaped rotatable heads 64 are of predetermined inner and outer diameters, to accommodate the dimensions of the screen frame, referred to generally by reference numeral 66

(FIG. 4). Each frame, as is usual and as shown in FIG. 4, is provided with conventional openings 68, 70 which are engaged by registration pins 72, 74, respectively, these being fixedly secured to and extending vertically upwardly from the top surface 76 of a rotatable head 64. The location of these pins, relative to the frame openings, critically correspond to registration pins provided in conventional manner on a silk-screen printing head. Thus, when the screen frame is registered relative to the warp and weft threads of the stretched woven fabric, as later more fully described, the screens will be properly registered when installed on the silk-screen printing head.

The inner peripheral surface 81 of an annular-shaped scale 78, importantly defines an opening 83. This allows for ventilation of toxic fumes from the stretching apparatus and work area from the adhesive (cyanoacrylate) used in securing a screen frame to the stretched fabric, as will be later, it is believed, more fully appreciated. The openings 83 in the scales 78 communicate with the internal cavity 24 provided in the base member 12. From this base member, although not shown, the toxic fumes of the adhesive are exhausted by conventional vacuum means to a self-contained filtering or adsorption unit in which is provided a body of charcoal particles whereby the toxic fumes are adsorbed from the air flow and fresh air is returned to the immediate environment. The cyanoacrylate adhesive, as later disclosed, is activated by an accelerator known to those skilled in the art, the accelerator being applied as a spray to the adhesive which has already been provided according to usual techniques on the top surface of the fabric which overlies a screen frame to which the stretched fabric is to be adhered. The adhesive, when applied, permeates the mesh of the woven fabric and contacts the top surface 85 of the underlying screen frame 66. Ventilation below the table 58 is made possible, quite advantageously, as the toxic fumes which eminate on application of the spray accelerator are heavier than air and tend to sink into the internal cavity 24 of the base member 12. Although not shown, the openings 83 can each exhaust toxic fumes directly into the internal cavity 24 or to a manifold, in conventional manner, which exhausts to the internal cavity.

As will be seen from FIG. 4, an annular-shaped scale 78 is provided in combination with each rotatable head 64. Nevertheless, the scale is mounted to be fixed relative to the rotational movement of the rotatable head. The top surface of the annular-shaped scale or dial 78, as shown in FIG. 4, need not necessarily be in the same horizontal plane as that defined by the top surface 76 of a rotable head 64. In this case, if desired, the outer diameter of the annular-shaped scale can be somewhat greater than the inner diameter of the annular-shaped rotatable member 64. The scale should be mounted, however, so that the top surface of the scale does not interfere with the rotational movement of the rotatable member.

If desired, however, the top surface of the scale 78 and rotatable member 64 can be provided in the same horizontal plane. The outer peripheral surface of the scale in such a case should be mounted closely adjacent the inner peripheral surface 79 of a rotatable head. Nevertheless, the outer peripheral surface of a scale should not interfere with the rotational movement of the annular-shaped rotatable member 64. Moreover, although the outer peripheral surface of a rotatable head 64 should be closely adjacent the inner peripheral surface (not shown) of the opening in the table 58 in which it is located, the respective diameters should be chosen so that no constriction is caused to the rotational movement of the rotatable member. The scale 78 is provided on its top surface with angular degree graduations or marks which, as will be appreciated by reference to FIG. 4, read clockwise, 0° at 9 o'clock and 180° at 3 o'clock, the reason for which will soon be disclosed. The graduations between 0° and 180° can be provided in any uniform manner desired, e.g., graduations 1° apart. It will be appreciated, of course, that such a scale is provided in combination with each of the rotatable heads.

Although less preferred, those skilled in the art will readily appreciate that a scale such as scale 78 need not necessarily be provided. Instead, the angular gradations can be provided, for example, on the top surface of an annular-shaped rotatable member along the outer periphery. In this case, an indexing mark can be provided on the top surface of table 58 at the periphery defined by the opening in table 58 in which the rotatable member is located. Or, instead, the angular gradations can be provided on the top surface of the rotable member 64 along the inner peripheral edge.

The table 58 is adjustable vertically upwardly and downwardly, as earlier disclosed, so that it can be raised and lowered relative to the support member 26, as desired. This is an important feature in the process for the manufacture of silk-screens according to the invention. Thus, a screen frame 66, as will be more fully appreciated from the disclosure hereinafter, is placed in contact with an already stretched fabric and, most importantly, at the desired angle relative to the mesh in the stretched fabric. One need not, as done heretofore, place a protractor in contact with a table for the screen frame, draw an angled line on the table surface, then position the screen on the table in accordance with the angled line, and thereafter stretch the fabric over the screen frame. The rotatable head 64 and scale 78 provided in the table 58 upon which the screen frame is supported is of great advantage compared to use of the protractor as used heretofore as it provides for more accurate location of the mesh in the woven stretched fabric and at the angles that the color separations were made.

The stretching apparatus 10 used in the practice of the invention, as earlier disclosed, is provided with means (not shown) for independently or simultaneously controlling the tension provided on the warp and weft threads. Thus, referring to FIG. 2, the distance between the opposing clamping means 42, 46 is made greater or less to provide the tension desired on the warp or weft threads of the woven fabric 56, as the case may be. The means for accomplishing such a function can be readily provided by one skilled in the art. For example, in the practice of the invention, pneumatic means (not shown) was provided to control the separation between opposed clamping means, hence the tension on the warp and weft threads.

Quite advantageously, as the height of table or platform 58 is adjustable, this allows for the woven fabric 56 to be stretched to the desired tension, out of contact with the screen frames 66. Then, the table 58 with the screen frames located on the rotatable heads 64 and at the correct angle relative to the mesh of the fabric is raised to contact the bottom surface of the stretched fabric. Afterwards, the adhesive is applied to the woven fabric and cured.

The base member, platform, table, and rotatable heads can be of various materials of construction, provided such accomplish the functions disclosed herein. The platform 58 used in the practice of the invention is of anodized aluminum. The rotatable heads, however, used in the practice of the invention were of NYLATRON plastic; however, other plastic materials will also be found suitable. Those skilled in the art will be readily able to select appropriate materials of construction for the various elements of the stretching apparatus. To aid in the removal of the adhesive or spray accelerator, in case such contacts the top surface of a rotatable head 64, the top surface of the heads should be provided with a suitable release coating, e.g., a light paraffin coating. The TETKO clamp members 50 used in the practice of the invention each comprise magnet means which assists with the clamping/unclamping movements. The clamp member faces that come in contact with the edges of the woven fabric to be stretched are provided with replaceable urethane strips. Thus, better frictional characteristics will be provided between the fabric and opposed clamp faces gripping the edges of the fabric thereby avoiding slippage.

Figure 6:
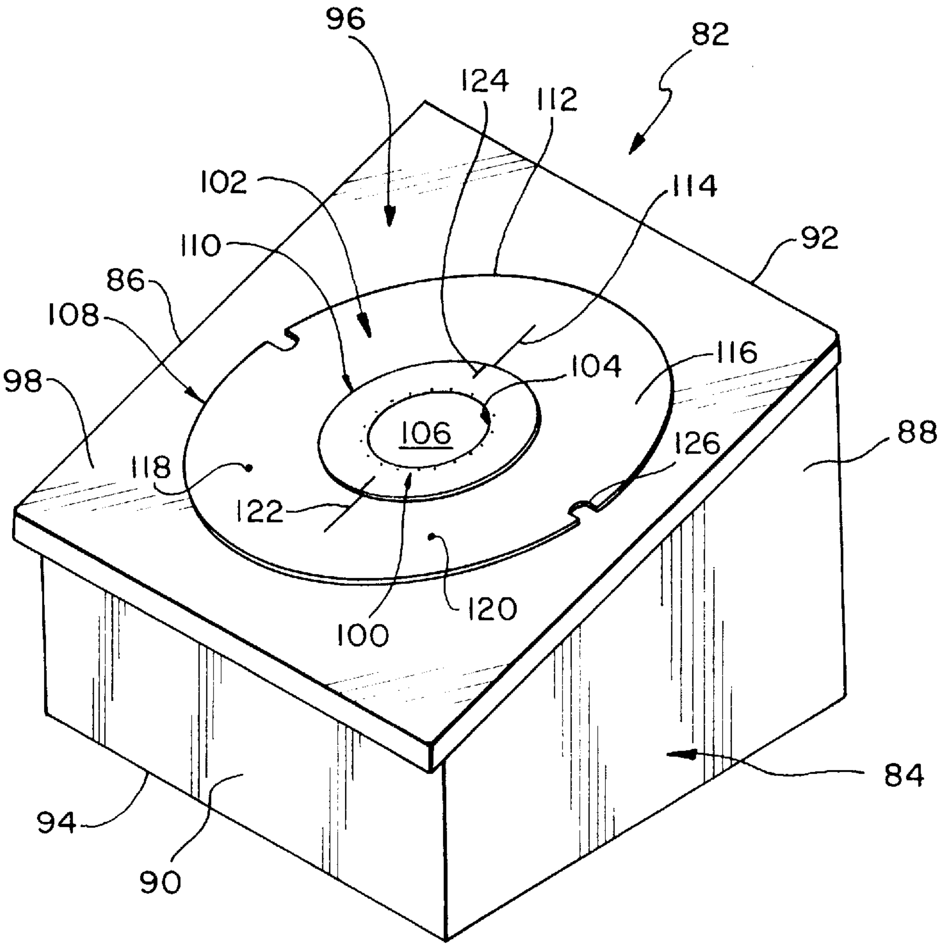
FIG. 6 is a perspective view showing means for determining off-line the angle at which a screen frame must be placed relative to the warp and weft threads of the stretched woven fabric for at least the minimization of moire' in the silk-screen printing of a halftone.
Figure 6:
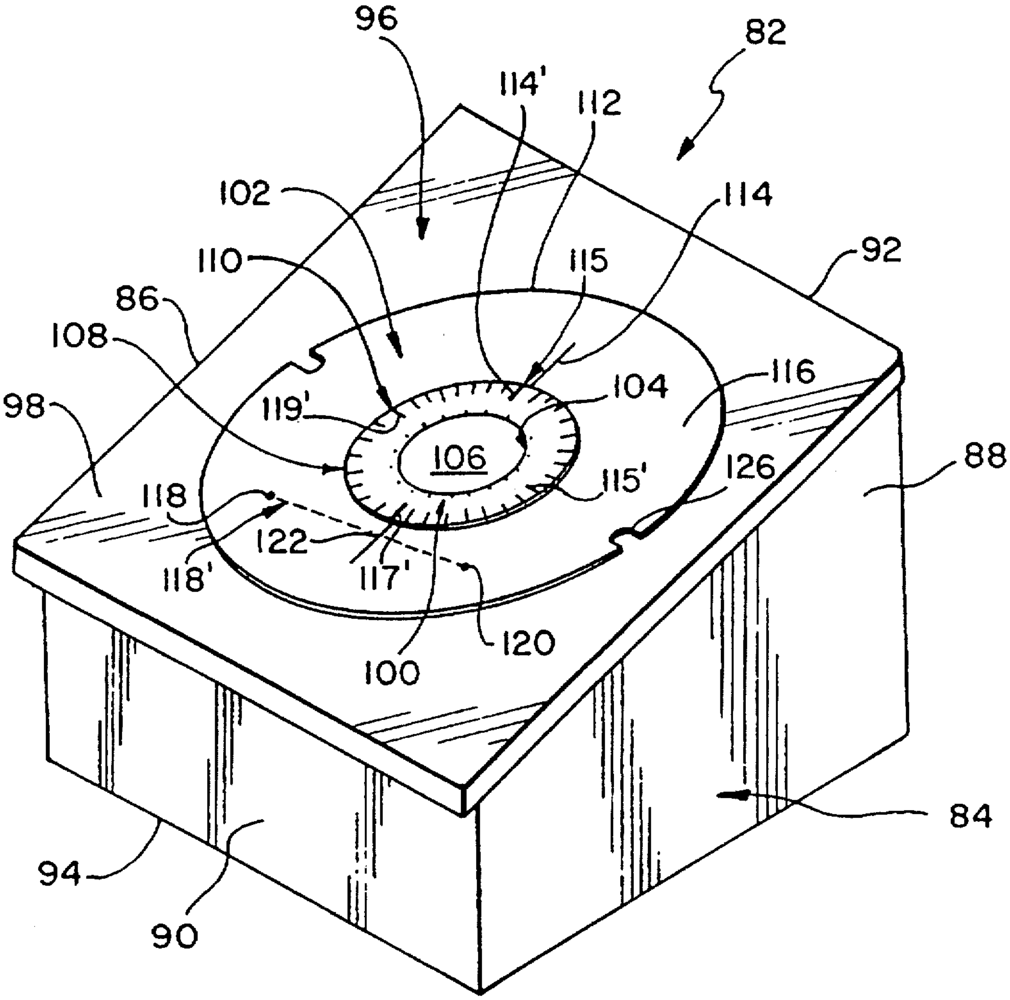

Referring now to FIG. 6 of the drawing, there is shown therein moire' detection apparatus comprising a light box 82. The moire' detection apparatus provides means and an off-line system for the predetermination of the angle at which a screen frame 66 must be located, as earlier disclosed, relative to the mesh of the stretched fabric 56. This predetermination or off-line registration is of great advantage in the manufacture of silk-screens according to the invention for the printing of halftones. The off-line registration system whereby moire' can be detected and eliminated or at least minimized or localized depends largely upon the halftone color separations made and the resulting film positives as later more fully disclosed. The color separations to be made in any particular case will, of course, depend upon the colors in the particular image or artwork to be duplicated, e.g., silk-screen printed on a compact disc (not shown) according to usual techniques.

The light box 82 comprises a body member 84 of box-like construction defined by vertically upright, spaced-apart side walls 86, 88, parallel to one another and upright, spaced-apart end walls 90, 92, as seen from the drawing. The body member 84 is closed at its bottom end in usual manner by a horizontally disposed bottom providing means for support of the light box on a horizontally disposed surface such as a table (not shown). Nevertheless, if desired, the light box 82 can be integral with the top surface of a cabinet which is provided with a suitable number of drawers for storage of masks, as disclosed later on, color separation film positives, etc.

The top end of the body member 84 is provided with a top closure 96 which preferably, as seen in FIG. 6, tapers downwardly from the back end wall 92 to the front end wall 90. This feature, quite advantageously, allows one to best view a film positive and moire' relationship, as will be later more fully disclosed. Nevertheless, the top closure can be in a plane parallel to that defined by the bottom of the light box 82, if desired; however, that is less preferred. The top closure 96 comprises a fixed outer portion 98 and a fixed, annular-shaped, inner member 100. Surrounding the fixed inner annular-shaped member 100, there is provided a rotatable, annular-shaped member or dial 102, the purpose for which will be made clear hereinafter.

Although not shown in the drawings, there is located in the light box 82 an incandescent light providing a single source of light behind the centrally located opening defined by the inner peripheral surface 104 of the fixed annular-shaped member 100. A conventional 60 watt bulb will be found quite satisfactory for the purposes of this invention. The incandescent bulb is located directly behind a plate glass window 106 fixedly secured to the periphery 104 defining the opening. This plate glass window provides means for the centering location of color separation positives, as later disclosed. The inner diameter of the annular-shaped member 100 can vary somewhat; however, an opening 5.25" will be found useful in centering the film positives.

The outer diameter defining the outer periphery 108 of the fixed inner annular-shaped member 100 is of no particular consequence to the invention. It need merely be slightly less than the inner diameter 110 of the rotatable annular-shaped member 102 so that the rotatable member is freely rotatable relative to the fixed members. Likewise, the outer diameter of the annular-shaped rotatable member can vary somewhat. It need merely be slightly less than the diameter of the circular-shaped opening 112 provided in the top closure 96. The peripheral edge of the opening 112, as well as those peripheral edges defined by the annular-shaped dial 102 and the fixed annular-shaped member 100, as will be appreciated from FIG. 6, are all concentric.

As shown in FIG. 6 of the drawing, the outer perimeter of the fixed annular-shaped member 100 is provided with a scale 115 reading counterclockwise from 0 degrees to 360 degrees comprising a plurality of uniformly-spaced 1° markings. Importantly, as will be later appreciated, the scale provided on this fixed annulus, reads in counter-clockwise manner as the scale provided on the rotatable heads 64 reads in clockwise fashion, Thus, the angle at which moire' is eliminated or at least minimized or localized in the film positives in the off-line registration system can be, quite advantageously, carried over in the manufacture of the silk-screens for half-tone printing, later to be more fully disclosed. In general, however, this results from the fact that the screen frame is located above the woven fabric of the silk-screen in the off-line registration system and below the stretched fabric in the manufacture of the silk-screen. Those skilled in the art will readily appreciate, however, that the orientation of the scales can be reversed, if desired. Thus, if desired, the scale provided along the outer peripheral edge of the fixed annular-shaped member 100 can read clockwise and that scale provided on the rotatable heads 64 read counter-clockwise. The rotatable member or dial 102, as seen in FIG. 6, is provided with an elongated indexing mark 114. Thus, when the dial 102 is rotated, as later disclosed, the angle of rotation can readily be determined.

Provided on the dial 102 and extending vertically upwardly from the top surface 116 thereof are two spaced-apart registration pins 118, 120. These two registration pins are spaced-apart from one another a predetermined distance and lie on an imaginary chord 118 of the circle defined by the outer diameter of the dial 102. This chord, when the dial is at its home position as shown in FIG. 6, is bisected by that diameter of the rotatable annular-shaped member 102 which comprises an extension of index mark 114 and such are in perpendicular disposition to one another.

It is of critical importance that the two registration pins 118, 120 provided on the dial 102 be of the same size and location as the registration pins 72, 74 provided on the rotatable heads 64. Thus, these pins will be in correspondence with the openings 68, 70 provided in a silk-screen frame to be used in the manufacture of silk-screens according to the invention. As will be appreciated by those skilled in the art of silk-screen printing, the size and location of these registration pins will be determined by the screen registration system of the silk-screen apparatus in which the screens are to be used.

The dial 102, although not shown, is provided with means for locking the dial in place following the rotation of the dial 102, the reason for rotation being later more fully made clear. Various locking means known to those skilled in the art, will be found satisfactory for this purpose. For example, the dials 102 can be locked in place by a conventional spring plunger that engages with a member provided adjacent the outer peripheral edge of the fixed annular-shaped member 100 in male and female fashion.

The first step in the manufacture of a silk-screen according to the present invention, if such has not been done already by the printer, is to make the halftone color separations, e.g., make positive films of each of the colors to be printed, i.e., cyan, black, magenta, and yellow of the halftone image to be reproduced on, for example, a compact disc. This is done by techniques well known to those skilled in the printing art, the preferred separation being at approximately 120 lines of dots of color per inch.

If the color separations have already been made, e.g., by the printer operator who is going to be doing the silk-screen printing of, e.g., compact discs, the line count is, nevertheless, confirmed. The reason for this is that an accurate line count is critical to the screen manufacturer, as a first step in manufacturing a silk-screen. This confirmation can be accomplished in conventional manner by using a commercially available halftone calculator. To do this, the color separations or film positives provided are each, in turn, affixed to a light box having a single point incandescent light source (60 watt bulb), and the halftone line count made by the printer operator is confirmed. The line count for the color separation is confirmed, in general, by noting where the greatest effect of moire' occurs. The light box 82 in FIG. 6 can be, advantageously used for this purpose. In the event the printer operator has not provided the color separations, such will be done by the silk-screen manufacturer.

Nevertheless, regardless of who made the color separations from the image to be printed, it is most preferable that half-tone separations having a line count of 120 be made. This line count is most desired in preparing a silk-screen for halftone printing, as can be readily seen by reference to FIG. 7, wherein there is shown a conventional mesh/dot and moire' relationship chart. As shown by FIG. 7, with color separations having a line count of 120 lines/inch, there exists the least possibility for moire' to occur using a woven fabric having a mesh count of either 420 or 465 lines/inch. Even with fabric having a mesh count of 355 or 380, any moire' is usually localized.

Having confirmed, or made as the case may be, the line count for each of the color separations or the color separations themselves, the four color process film positives obtained from the color separations, in the case of four color printing, are then each employed in the off-line registration system, as later disclosed. This is to determine the angle at which the mesh of the woven fabric should be provided relative to the screen frame in the silk-screen manufacturing process, to eliminate, or at least minimize or localize moire'.

In the case of four color printing a set of four color process film positives must be provided. This, as known to those skilled in the art, need be done because a different silk-screen must be manufactured to print lines of dots of each of the four colors. These color separations, or color process film positives, are each placed, in turn, on the plate glass window 106 located in the opening of the light box 82, with the emulsion side of the film positive being on the upside. Crop or registration marks provided on the film positives, e.g., at 12, 3, 6, and 9 o'clock, in usual manner, are lined up with corresponding marks 114', 115', 117', and 119' provided on the annular-shaped fixed member 100 of the light box 82. Although not earlier disclosed, the fixed annular-shaped member 100 is provided with a plurality of openings denoted by reference numeral 122 whereby a source of vacuum (not shown) can communicate with the bottom side of a film positive. Thus, when a film positive has been properly aligned with the registration marks above disclosed the vacuum is turned on. This, then holds the film positive in its aligned position until the vacuum is turned off. As will be appreciated, the vacuum source communicates with the film positives from within the internal cavity defined by the side and end walls of the light box. The vacuum source is located outside the light box 82 and is connected thereto in conventional manner whereby to communicate with the internal cavity of the light box. Any commercially available vacuum pump can be used provided it provides sufficient vacuum to hold a color process film positive in place.

Next, a silk-screen having a suitable mesh(thread) count is placed, in turn, upon each of the color film separations, with the mesh side down. The openings provided in the frame of the silk-screen, like those provided in frame 66, are located on the registration pins 118, 120 provided on the rotatable dial 102. The screens for use in the off-line registration system are provided, and this is a critical feature of this aspect of the invention, with the lines of mesh, i.e., the warp and weft threads at 90° angles to the frame members. Thus, the color film separation, at this point, will be square with respect to the silk-screen frame. In other words, the mid-point dividing line of the color film separation and the screen frame will coincide with one another and be in registration with the index mark 114. The mesh count for the particular screen chosen for use in the pre-registration system can, as will be appreciated by those skilled in the art, vary somewhat. This will depend upon a number of factors including the image to be printed, the number of colors to be separately printed, the extent of moire' caused by the image, etc. Most desirable a screen having a mesh count that can be used for each of the colors to be printed in the elimination or at least the localization or minimalization of moire' is preferred. Thus, only one table of screens, as later disclosed, will need be made.

The dial 102, with a color film separation in place, is then rotated by hand slowly in a clockwise direction. Focus should be maintained upon a small part of the visual field provided by the opening in the fixed member 100 whereby moire' can be more readily detected by the human eye. If one focuses on the image seen in the entire visual field, it is somewhat difficult to interpret the moire' as it changes with rotation of the dial 102. It will be appreciated that the screen frames, hence screen, rotates independently of the color film separation which is in fixed location on the fixed inner annular-shaped member 100. As the dial 102 is rotated, moire' is seen to be eliminated or at least becomes minimal or undetectable by the human eye for that particular color separation. Once this point is reached the angle is then read on the scale provided on the fixed annular-shaped member 100. This is the angle that the screen frame 66 should be provided, relative to the mesh lines in the stretched woven fabric 56, in the subsequent manufacture of the silk-screens. Thus, the angle at which moire' is at least minimal or localized for each of the silk-screens to be manufactured and later used in the particular half-tone printing process is determined. If desired, indentations 126 can be provided in rotatable member 102 to aid the rotation thereof.

When the screen angles have been determined in the off-line registration system, the stretching apparatus 10 is then set up. Screen frames 66 are located upon each of the rotatable heads 64. The proper location is determined by the openings 68, 70 provided in the screen frames, and the registration pins 72, 74 provided on the rotatable head 64. The rotatable heads are then each rotated to the desired angles, as determined in the off-line registration system, for each of the color film positives. The angle to which a rotatable head 64 is rotated as indicated by the index mark on indexing means 124, is the same as that determined in the off-line registration system as the scales 78 and that provided on the fixed member 100, read in opposite directions. The rotatable heads are each locked at their respective angles by a locking means such as indicated by reference numeral 128. The locking means 128 can take various forms as will be appreciated by those skilled in the art. In its most simplest construction, the locking means 128 can be a mere set screw whereby the inner peripheral surface of the annular-shaped rotatable member 64 is engaged.

Once the screen frames are properly located on the table 58, a woven fabric 56 (e.g. a plain weave 465 mesh count woven fabric) is cut into a 61" square and the warp and weft edges thereof placed on the surfaces of the fabric holding members 49 of the clamp members 50. This fabric can be cut before the screen frames are located, if desired. The particular sequence is of no particular importance. The fabric used in the manufacture of silk-screens is typically a polyester fabric as such has good elongation characteristics which allows the mesh fabric to achieve higher tensions, and with a shorter stretch time. Importantly, the fabric edges are provided square with the lengthwise directions of the clamping means, i.e., the clamping means 42, 46 clamp on the ends of the warp threads of the woven fabric and the clamping means 44, 48 clamp on the opposed ends of the weft threads. It will be appreciated by those skilled in the art, however, that the reverse can be done, if desired. The critical concern is that the ends of the warp and weft threads be substantially square with the square defined by the clamping means. This will, of course, provide that the stretch of the fabric be substantially 90°. The clamp members 50 in each of the clamping means should desirably be individually openable to allow for adjusting the linearity of the mesh to assure as approximate a 90° stretch of the woven fabric as possible.

With any adjustments made as deemed necessary, the warp and weft threads are ready to be brought to the desired tensions. The tensions on the warp and weft threads are increased by increasing the distance between opposed clamping means. Desirably, the tension on the warp and weft threads will be the same. The fabric is stretched in two stages. The first stretch should be such as to provide a tension that is slightly more than half (measured in newtons) the final tension desired. The tension at any particular point in the stretching operation can be determined in usual fashion using a conventional tension meter gauge in measuring newtons.

Using a low elongation polyester fabric (e.g. a plain weave fabric, 465 mesh) the final stretch should achieve a tension of about 24 newtons with a relaxed stretch of about 20 newtons. Thus, in the first stage, the woven fabric is brought to a tension of about 12 newtons, after which it is allowed to relax according to usual techniques. As is well known to those skilled in the art, this relaxation period is essential in stretching any fabric comprising polymeric strands due to the molecular structure of the particular polymeric material involved. Otherwise, the fiber strands making up the woven fabric may snap. The relaxation time desired in any particular case depends, at least in part, upon two variables. One is the particular fabric provided by different manufacturers. The other is how uniform the stretching is in bringing the warp and weft threads to the desired tension. The relaxation time in any particular case is determined empirically through test stretching, in advance.

Following relaxation of the woven fabric, after having been stretched in the first stage, the fabric is then stretched to full tension. At full tension, the tension at the four corners and in the center of the stretched fabric is checked. This is done to determine whether the overall tension is the same across the entire fabric surface. The tension on both the warp and weft threads in these locations is determined. The tension readings should desirably fall within + or −1 newton to assure that all screen frames will be compatible when imaged. In any event, those skilled in the art know that to obtain close registration in the silk-screen printing of multiple colors, for example, four color process printing, it is important that any variation in tension across the stretched fabric from which screens are manufactured be kept as low as possible. Where tension is different across the stretched fabric, the result will be silk-screens with different tensions, causing the images on each screen to be stretched differently from one another. Thus, the less the variation in tension, the closer the registration that can be obtained.

The woven polyester fabric having been stretched to the desired tension is then placed in contact with the screen frames provided on the rotatable heads located on the platform 58. This is accomplished by raising the platform vertically upwardly until the frames are each slightly pressed against the stretched woven fabric. The screen frames should, of course, be of a rigid material, e.g., steel frames were used in the practice of the invention. It is important, of course, that the frames used be planar without any bowing therein and that the frames each be seated properly on the respective rotatable heads. Otherwise, the stretched fabric will not be properly attached to the screen frames.

At this time, adhesive is applied to that portion of stretched fabric in opposition to the top surface of the screen frame. Thus, a small bead of cyanoacrylate adhesive is typically applied to the stretched fabric such penetrating through the woven fabric strands by capillary action and the mesh of the fabric to the top surface of the frame contacting the bottom surface of the stretched fabric. The adhesive can be, if desired, troweled so as to ensure penetration through the meshes in the fabric and to provide a layer of adhesive on the screen frame. The accelerator for the cyanoacryeate adhesive is then sprayed onto the fabric whereby the adhesive is cured to provide a tight bond between the stretched woven fabric and the surface of the screen frame. Each frame is secured in the same manner to the stretched fabric. Those skilled in the art will appreciate that other adhesives may be used, instead of a cyanoacrylate adhesive. Further, the means of application may also, differ, for example, a layer of adhesive can be applied directly to the screen frame prior to contact with the stretched fabric. Nevertheless, the adhesive used and manner of application earlier disclosed has been found to produce quite satisfactory results and is preferred in the practice of the invention.

Once the adhesive has cured, and the screen fabric has been fixedly secured to each of the frames, the tension on the stretched fabric is then released. The completed silk-screens are then removed from the excess fabric by cutting the fabric along the outside edges of the screen frames. Thus, the manufacture of the silk-screens is complete. The screens are then each coated with photo-sensitive emulsion in conventional manner.

Prior to the emulsion coating of the silk-screens, however, the film positives are each desirably checked according to usual techniques with the screen frames positioned at 90° to assure no moire' exists. Those skilled in the art of silk-screen printing will readily appreciate that every silk-screen may have some irregularities in the mesh fabric that may not be detected prior to the actual manufacture of the screens. Thus, the invention quite advantageously allows any problems with the screen to be detected prior to imaging the screen.

As is well known to those skilled in the art of silk-screen printing, the angles of color separation are of critical importance. The angles should be at the offset angles earlier disclosed. The importance of having film generated at the offset angle relationship disclosed earlier can be seen by overlaying the four color process film positives in registration with one another. If the above angles are not used, the result is a series of extreme moire' interference patterns.

Thus, in accordance with another aspect of the invention, the moire' detection apparatus 82, earlier disclosed, is used to preregister the film positives relative to one another and to a respective screen frame prior to exposing the emulsion coated screens to light, e.g. ultra violet light, according to usual techniques to obtain the desired images to be printed. In the past, this has been done, in general, by merely laying the film positives on top of one another on a light box and then rotating each of the film positives relative to one another by hand until the four colors, in the case of four color process printing, are in proper alignment with one another. This, of course, is not only a tedious process but it is most difficult, if not impossible, to obtain exact registration of the four color process film positives from time-to-time. Such a procedure requires that the films be re-registered again for imaging each time that a new set of screens is desired for the printing of the artwork involved. This is highly undesirable as the risk for misalignment of the film positives to be secured to the respective emulsion coated screens depends upon the operator performing such action from time-to-time.

Thus, according to this further feature of the invention, carrier masks are provided, for providing each of the color film positives in proper registration relationship one to the other. The carrier masks are defined by a screen frame of square shape to which is detachably secured a clear 7 mil MYLAR polyester film measuring 12"×12" the same size as the frame. Such a film thickness is desirable as it will provide stability to the film and the film will not shrink on being heated. The polyester film is provided at its bottom edge with two openings, these corresponding in location to the two openings provided in the frame. The frame openings, as are those in the polyester film are of a diameter so as to fit onto the registration pins 118, 120, earlier disclosed, provided on the dial 102. In the center of the film, there is provided a 5¼" circular-shaped opening, the purpose for which will soon be made clear. It will be appreciated by those in the art that this opening is of the same diameter as the plate glass window 106 provided in the opening defined by the inner periphery of the fixed annular-shaped member 100. Thus, the four masks provided, in the case of four color process printing, will register to one another and to the screen frames of the silk screens as earlier disclosed and as manufactured according to another aspect of this invention.

One of the carrying masks is located on the dial 102 on the registration pins earlier disclosed on light box 82. A color film positive having previously been provided with crop or registration marks in usual manner at 90° to one another is taped at 90°, emulsion side up, to the fixed annular-shaped member. It will be appreciated by those skilled in the art that crop or index marks are desirably provided on the fixed member 100 to aid in placement of the color film positives. It is important also that the dial 102 be locked at the 90° mark relative to the scale provided on the fixed annular-shaped member 100. Thus, as shown in FIG. 6, the index mark 114 will be directly opposite the 90 degree gradations of the scale provided on fixed member 100, indicated by reference numeral 124. The film positive is then taped to the carrying mask. The second mask is then positioned over the film positive in registration with the first mask. Next, the second color film positive is positioned on the second mask and visually aligned over the first color. The second film positive is then taped in position. This continues until each of the color film positive are provided in registration with one another, each being taped to a carrying mask. The sequence in which the film positives are provided is of no particular significance. It is important, however, that the central portion of the film positive be located so as to show through the opening provided in the mask. As the openings in the masks are each centrally located and coincide with the circular-shaped plate glass opening in the light box, the central portion of each of the film positives will be superposed one above the other and in a coinciding relationship. Thus, a set of four color process film positives are provided to be used in providing the images according to usual technique on the silk-screens manufactured, as earlier disclosed. It will be appreciated by those skilled in the art, and this is an important feature of this aspect of the invention, that the color film positives, hence the images later resulting are registered not only to the screen frames by virtue of the light box or registration apparatus 82 but also to the screen nest on the silk screen printer with which the silk-screens are to be used.

The set of four color process film positives is then ready to be used in providing imaged screens. Each carrier mask from the set (with a color film positive taped thereto) is then provided with a pin member or metal tab in each of the openings. Such a tab has an elongated pin having essentially the same diameter as the opening in a mask but being insertable therein and a holding member extending perpendicular to the length of the pin. The pinned mask is then located in the holes provided in a screen frame of a screen manufactured, as earlier disclosed, and which has the mesh oriented in the proper direction for the screen printing of that particular color. The screen previously provided is then provided, in accordance with conventional techniques, with a coating of a photosensitive emulsion commonly used for imaging silk-screens. The screens are then exposed to light and the unexposed areas washed away in conventional manner. The screens are then ready for use in the printing of the artwork involved.

Quite advantageously, with the color film positives each being taped to a carrying mask and at the right angle for registration of the films with one another, screens can readily be re-imaged, as and when desired. Those skilled in the art will be appreciative of the fact that the films should each be attached to a carrying mask by a permanent transparent tape, to assure no movement or shrinkage of the tape while being stored for possible later use.

As will be understood by those skilled in the art, various modifications and changes can be made in the invention and its form and construction without departing from the spirit and scope thereof. The embodiments of the invention disclosed herein are merely exemplary of the various modifications that the invention can take and the preferred practice thereof. It is not, however, desired to confine the invention to the exact construction and features shown and desired herein, but it is desired to include all such as properly come within the spirit and scope of the invention disclosed and claimed.

We claim:

1. Process for making a set of silk-screens for use in a silk-screen printing apparatus for a multicolor printing process, said process comprising the following steps:

(a) preparing a film positive of each of the colors to be printed on a surface, each said film positive being defined by an emulsion side and by registration marks;

(b) providing a light table having a top closure defined by a circular-shaped opening of a predetermined diameter defining a peripheral surface, a fixed annular-shaped member defining inner and outer peripheral surfaces being concentric to the circular-shaped opening, the inner peripheral surface of the fixed annular-shaped member defining a circular-shaped opening in communication with a light source, and an annular-shaped rotatable member concentric to the fixed annular-shaped member defining inner and outer peripheral surfaces, the inner peripheral surface of the annular-shaped rotatable member being of a predetermined greater diameter than the outer peripheral surface of the annular-shaped fixed member and the outer peripheral surface of the rotatable annular-shaped member being of a predetermined diameter less than that of the circular-shaped opening, an indexing mark being provided on the rotatable member, indexing marks being provided on the annular-shaped fixed member indicating angular degrees, two spaced-apart vertically disposed registration pins being provided on a chord of an outer circle defined by the annular-shaped rotatable member;

(c) detachably affixing one of the color film positives of each of the colors to be printed on the fixed annular-shaped member, said emulsion side of said one of the color film positives being face up and said one of the color film positives being so oriented on the fixed annular-shaped member that the registration marks on said one of the color film positives provides said one of the color film positives in square orientation on the fixed annular-shaped member;

(d) placing a silk-screen comprising a screen frame and a screen comprising a woven fabric having a predetermined mesh count on the annular-shaped rotatable member and in superposed relationship with said one of the color film positives with the mesh side of the silk-screen against the emulsion side of said one of the color film positives, the mesh in the silk-screen being at 90 degrees to the screen frame;

(e) rotating the annular-shaped rotatable member to an angle relative to said one of the color film positives while visualizing said one of the color film positives against the light source until any moire' detected initially through the mesh in the woven fabric becomes at least minimized to the human eye;

(f) noting the angle of the mesh at which the moire' in said one of said color film positives becomes at least minimized;

(g) repeating steps (c)–(f) for each of the colors to be printed on said surface other than said one of the color film positives;

(h) providing means for stretching a woven mesh fabric to a desired degree of tension, said woven fabric being provided in a horizontally disposed plane;

(i) stretching the woven mesh fabric to the desired degree of tension;

(j) providing a plurality of silk-screen frames in a plane below that of the woven fabric, said plurality of silk screen frames being at least equal in number to the number of color film positives;

(k) orienting each of the plurality of silk-screen frames relative to the mesh in the stretched woven fabric at the angle earlier determined at which moire' becomes minimized;

(l) raising the oriented plurality of silk-screen frames to the stretched woven fabric; and (m) securing the stretched woven fabric to each of the silk-screen frames.

2. Process according to claim 1 further comprising stretching the woven mesh fabric to a desired degree of tension in two steps.

3. Process according to claim 2 further comprising stretching the woven mesh fabric in the first step of said two steps to about half of the desired degree of tension.

4. Process according to claim 3 wherein the woven mesh fabric has a mesh count of at least about 305 mesh/inch and said process comprises stretching said woven mesh fabric to a desired degree of tension of about 24 newtons.

5. Process according to claim 1 wherein the screen frame comprises parallel side edges and parallel end edges in perpendicular disposition to the side edges, and said woven fabric of the screen placed on the light table comprises a plurality of warp and weft threads, a plurality of mesh being defined by said plurality of warp and weft threads, said plurality of mesh being in square disposition to the parallel side and end edges of the screen frame and said process further comprises providing a pair of openings in at least one of the parallel end edges of said screen frame, said pair of openings being provided in predetermined spaced-apart locations.

6. Process according to claim 5 wherein outer and inner diameters define said annular-shaped rotatable member on the light table, and said process further comprises providing means for registration of said screen frame on said annular-shaped rotatable member relative to the indexing mark provided on the annular-shaped rotatable member, said means for registration being provided on a chord of a circle defined by the outer diameter of said annular-shaped rotatable member.

7. Process according to claim 6 further comprising providing two pins in vertical disposition for the means for registration, said two pins being of a size and shape and spaced-apart from one another so as to intrude into said pair of openings in said screen frame when said screen is placed on the annular-shaped rotatable member.

8. Process according to claim 7 further comprising providing a home position for said annular-shaped rotatable member whereby the indexing mark on said annular-shaped rotatable member divides said chord of a circle in half when the annular-shaped rotatable member is at the home position.

9. Process according to claim 8 further comprising providing a scale reading from 0 to 360 degrees on said fixed annular-shaped member.

10. Process according to claim 9 further comprising providing said scale to read in a counterclockwise manner.

11. Process according to claim 1 further comprising providing index marks on the fixed annular-shaped member at 12 o'clock, 3 o'clock, 6 o'clock, and 9 o'clock for registration with indexing marks provided on each of said color film positives.

12. Process according to claim 1 further comprising providing a plate glass in said circular-shaped opening of the light table.

13. Process according to claim 1 further comprising providing a circular-shaped opening defined by the inner peripheral surface of said fixed annular-shaped member of 5.25 inches in diameter and centering a color film positive over said circular-shaped opening.

14. Process for making a set of silk-screens for use in a silk-screen printing apparatus for the halftone printing of a surface comprising the following steps:

(a) providing color separations of the halftone image to be silk-screen printed on a surface;

(b) determining the angle at which the mesh of a woven silk-screen should be for a color separation relative to a screen frame for the woven silk-screen to minimize moire';

(c) providing a square-cut woven fabric comprising a plurality of warp and weft threads each terminating in opposed ends, a plurality of mesh being defined by said plurality of warp and weft threads;

(d) providing stretching apparatus for stretching said square-cut woven fabric comprising means for stretching said woven fabric provided in a horizontally disposed plane, said means for stretching comprising four clamping means arranged in a square-shaped pattern, each of said clamping means comprising a plurality of clamping members, a platform being provided in a horizontally disposed plane below said means for stretching, a plurality of annular-shaped rotatable members being provided on said platform, said plurality of annular-shaped rotatable members corresponding in number to the color separations provided, each of said plurality of annular-shaped rotatable members being freely and individually rotatable;

(e) placing said square-cut woven fabric in said stretching apparatus;

(f) placing a screen frame on each of said plurality of annular-shaped rotatable members;

(g) rotating each of said plurality of annular-shaped rotatable members whereby to provide a screen frame placed on the annular-shaped rotatable member at the angle determined to minimize moiré for a color separation;

(h) stretching said square-cut woven fabric; and (i) securing the screen frames to said woven fabric after it is stretched.

15. Process for making a set of silk-screens for use in a silk-screen printing apparatus for the halftone printing of a surface comprising the following steps:

(a) first obtaining halftone color separations of artwork to be printed on a substrate in a silk-screen printing process, an emulsion side defining each of said halftone color separations, and registration marks being provided on each of said halftone color separation at 12, 3, 6, and 9 o'clock;

(b) providing a light table, a top closure being provided on said light table, a circular-shaped opening of a predetermined diameter being provided in said top closure, a peripheral surface being provided on said circular-shaped opening, a fixed annular-shaped member being provided concentric to said circular-shaped opening, inner and outer peripheral surfaces defining said fixed annular-shaped member, the inner peripheral surface of the fixed annular-shaped member defining a circular-shaped opening, a light source being provided in communication with said circular-shaped opening defined by the inner peripheral surface of the fixed annular-shaped member, and an annular-shaped rotatable member being provided concentric to the fixed annular-shaped member, inner and outer peripheral surfaces defining said annular-shaped rotatable member, the inner peripheral surface of the annular-shaped rotatable member being of a predetermined greater diameter than the outer peripheral surface of the fixed annular-shaped member and the outer peripheral surface of the annular-shaped rotatable member being of a predetermined diameter less than that of the circular-shaped opening provided in said top closure, an outer circle being defined by said annular-shaped rotatable member, an indexing mark being provided on the annular-shaped rotatable member, indexing marks being provided on the fixed annular-shaped member indicating angular degrees, two spaced-apart vertically disposed registration pins being provided on a chord of the outer circle defined by the annular-shaped rotatable member;

(c) detachably affixing a halftone color separation on the fixed annular-shaped member, said emulsion side of said halftone color separation being face up, said halftone color separation being so oriented on the fixed annular-shaped member that the registration marks on said halftone color separation provide said one of said halftone color separations in square orientation on the fixed annular-shaped member;

(d) placing a silk-screen comprising a screen frame and a screen comprising a woven fabric having a predetermined mesh count on the annular-shaped rotatable member and in superposed relationship with said halftone color separation, a mesh side of the silk-screen being defined by said woven fabric and said mesh side of the silk-screen being against the emulsion side of the color separation, the mesh in the silk-screen being oriented at 90 degrees to said screen frame;

(e) rotating the annular-shaped rotatable member relative to said halftone color separation while visualizing said halftone color separation against a light source until any moire' detected initially through the woven mesh fabric becomes at least minimized to the human eye;

(f) noting the angle at which moire' becomes at least minimized; and (g) repeating steps (c)–(f) for each of the halftone color separations obtained.

* * * * *

UNITED STATES PATENT AND TRADEMARK OFFICE
CERTIFICATE OF CORRECTION

PATENT NO. : 5, 867, 882
DATED : February 9, 1999
INVENTOR(S) : William M. Karlyn et al It is certified that error appears in the above-indentified patent and that said Letters Patent is hereby corrected as shown below: The drawing sheet, consisting of Figs. 6, should be deleted to be replaced with the drawing sheet, consisting of Figs. 6 as shown on the attached page.

Signed and Sealed this

Thirteenth Day of July, 1999

Attest:

Q. TODD DICKINSON

*Attesting Officer* *Acting Commissioner of Patents and Trademarks*